Oct. 30, 1962   R. E. WYER   3,061,096
AUTOMATIC SIFTER AND FAN CONTROL MEANS FOR COMBINES
Filed Sept. 19, 1960   2 Sheets-Sheet 2
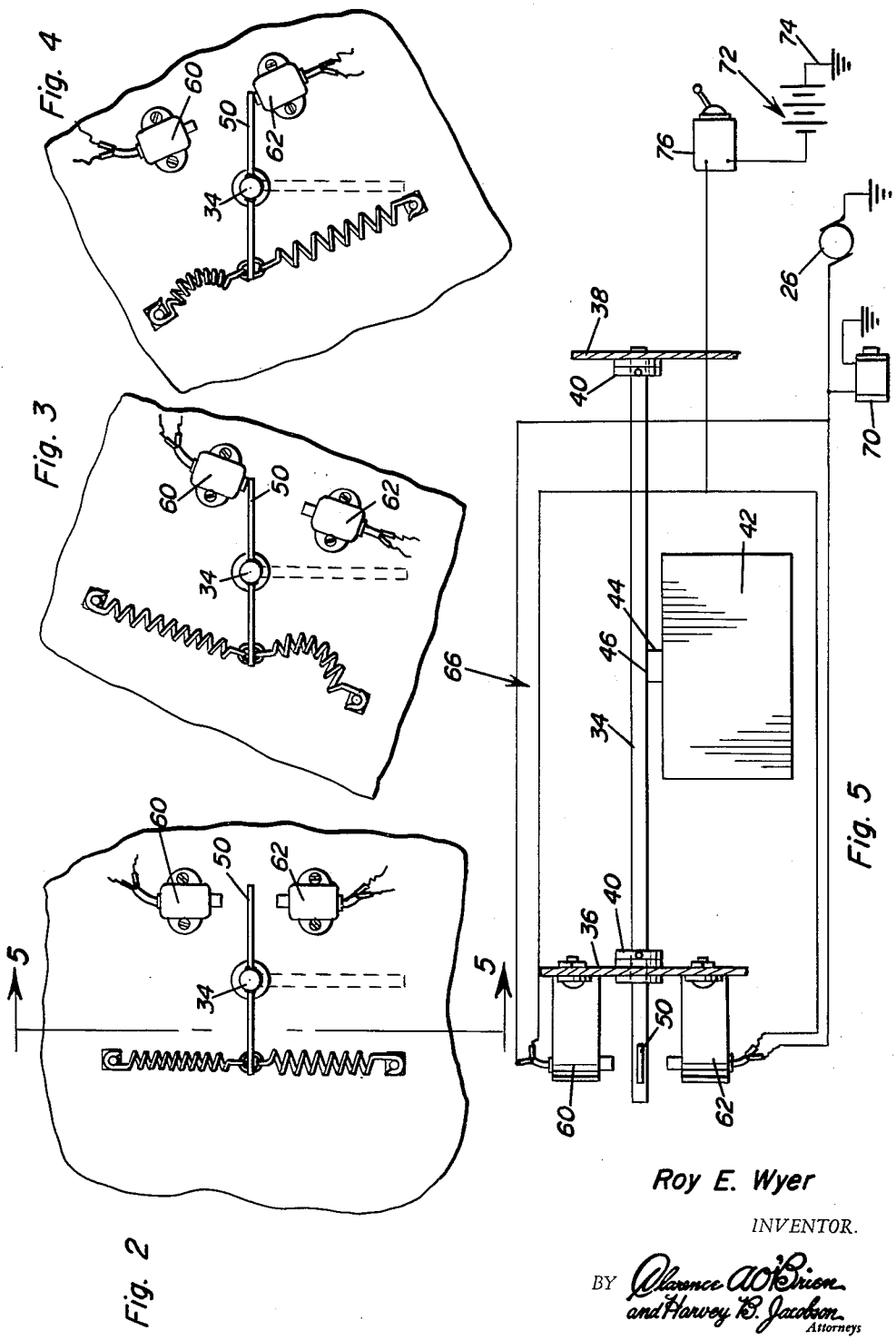
Roy E. Wyer
INVENTOR.

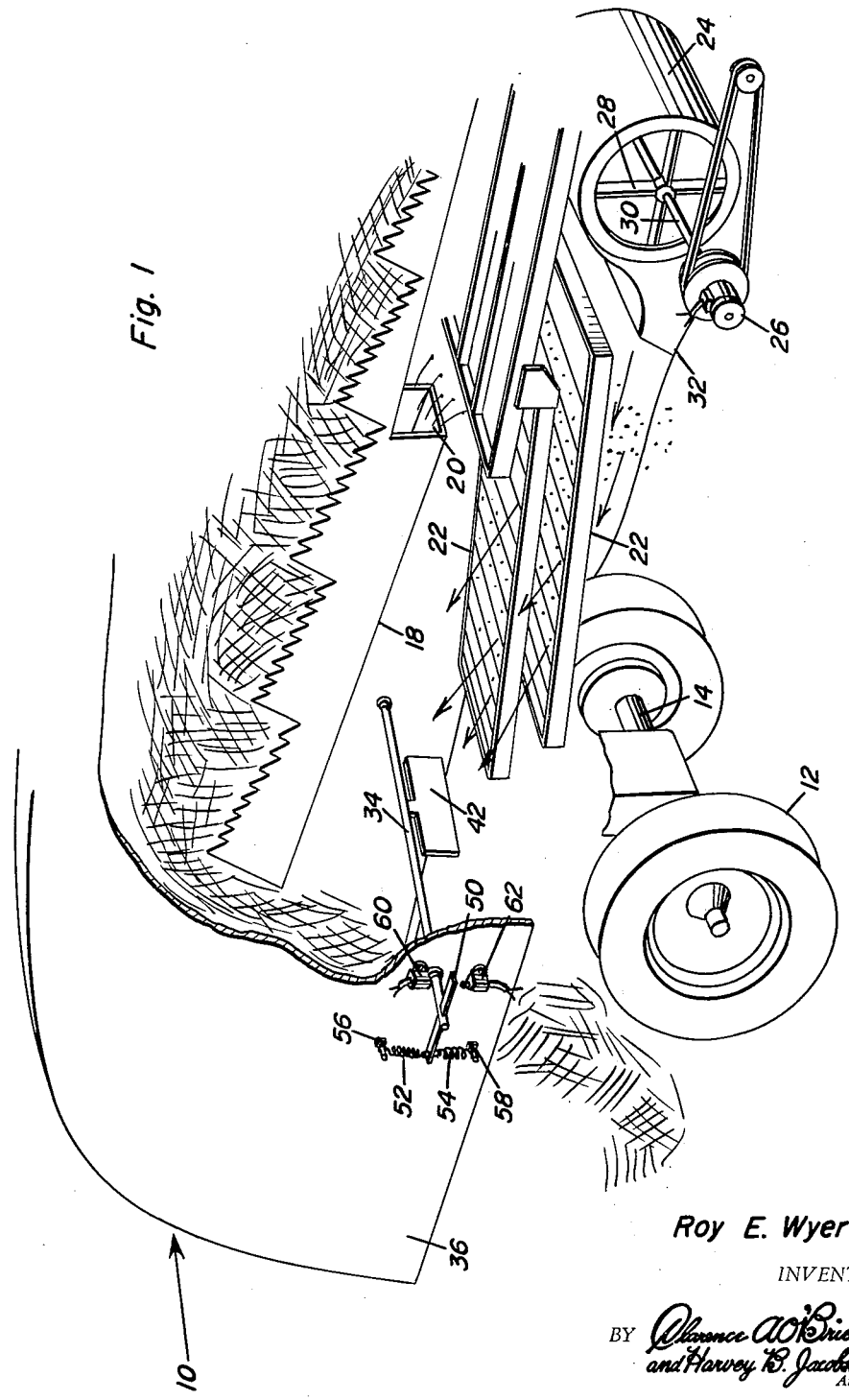

United States Patent Office 3,061,096
Patented Oct. 30, 1962

3,061,096
AUTOMATIC SIFTER AND FAN CONTROL MEANS
FOR COMBINES
Roy E. Wyer, 616 Main, Ritzville, Wash.
Filed Sept. 19, 1960, Ser. No. 56,860
11 Claims. (Cl. 209—26)

This invention relates generally to agricultural equipment and more particularly to an attachment for agricultural equipment as combines and the like for the cleaning mechanism by accurately and constantly controlling the fan speed and sieve opening.

Present day combine harvesters employ fans for moving air for the purpose of blowing chaff from the grain. The air is blown through the provided sieves as the material moves thereacross. In this manner, the chaff is blown away and the grain is properly retained. Present day equipment available permits the sieves to be adjusted for a particular opening and allows the fans to be controlled for a desired speed. However, once the adjustment of the sieves and fan is made, it will remain as set. Accordingly, the sieves and fan are of course set for an average condition or crop. However, as the crop conditions change, the adjustment is incorrect at times and therefore wheat is lost by either being blown over the rear of the machine by an over abundance of air, resulting from too little material on the sieves. On the other hand, the wheat may be carried over the rear by riding in the chaff when much material on the sieves blocks the air preventing it from going through the sieves. Aside from varying crop conditions, the same type of malfunction occurs when the combine harvester goes up or down hill. As the machine goes up hill, the material moves too easily over the rear of the sieves and consequently the normal amount of air blows the grain over the sieves. It will be appreciated that when the combine goes down hill, the material has to move up hill, and therefore the material movements slow down permitting the material to pile up on the sieves. This causes the wheat or grain to ride over the rear in the heavy chaff.

In the light of the above, it is the principal object of this invention to provide an automatic control mechanism for use with agricultural equipment as combine harvesters and the like for automatically adjusting the sieve opening and fan speed dependent on crop conditions, the up or down hill movement of the machine, and the change in velocity of air flowing through the sieve due to varying amounts of material thereon of the machine.

It is a more particular object of this invention to provide an extremely simple attachment for combines which significantly increases the operation thereof assuring a maximum amount of grain retention. Inasmuch as the attachment is relatively simple in construction and operation, the installation and manufacturing costs are relatively low and the reliability of the attachment is extremely good. Few moving parts are employed and accordingly the attachment is virtually maintenance free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view partially broken away illustrating a portion of a conventional combine harvester and showing the manner in which the invention is operatively supported thereon for controlling the speed of the fan and the opening of the sieves;

FIGURE 2 is a side elevational view showing the control apparatus forming the subject matter of this invention in a neutral spring biased position in which the fan operates at normal speed and the sieve opening remains adjusted for an average crop condition. In this position the air flow on vane 42 and the tension of spring 54 are balanced to hold the control apparatus in a neutral position;

FIGURE 3 is a side elevational view similar to FIGURE 2 showing the operation of the control apparatus when the combine moves down hill necessitating increased air movement by increased fan speed and the closing of the sieve opening;

FIGURE 4 is a side elevational view similar to that of FIGURES 2 and 3 showing the position assumed by the control apparatus when the combine moves up hill resulting in a reduction in fan speed air movement and also an opening of the adjustable sieves; and FIGURE 5 is a vertical sectional view taken substantially along the plane 5—5 of FIGURE 2.

With continuing reference to FIGURE 1 the numeral 10 generally represents a conventional combine harvester including rear ground wheels 12 supported on spindles 14. The combine is substantially conventional in all respects and includes such elements as straw walkers 18 from which grain and chaff leave at 20 falling on sieves 22. The sieves 22 are also conventional and are adjustable in any conventional manner desired. It is stressed that the particular manner in which the sieves openings are adjusted does not form a part of the invention herein and the invention here is restricted to the control means for initiating the adjustment of the sieve openings with any means being provided therefor. A fan housing 24 includes a fan therein with variable speed control means provided and operated by motor 26. The motor 26 may be connected to an adjustable pulley for driving the fan blades 28 through the shaft 30 at different speeds. The fan blades 28 expel air through an outlet spout 32. The means provided for adjusting the rotational speed of the fan blades 28 comprises a pulley on shaft 30 having two annular sections spaced so as to provide a V-groove therebetween for receiving a drive belt. The motor 26 axially slides one of the annular sections on shaft 30 for adjusting the effective diameter of the pulley. Such a variable speed control pulley is disclosed in U.S. Patent No. 2,920,493, and the electrically controlled pulley shown in FIGURE 1 of this patent may comprise an exact duplicate of the one disclosed in this application. It is again stressed that the invention herein is not concerned with the type of speed adjustment employed for the fan but is concerned only with the means for detecting the need of speed adjustment along with the means for initiating the speed adjustment action.

Air is driven by the fan blades 28 through the outlet spout 32 and up through the sieves 22 with the air acting to blow away the chaff and allowing the grain to move independent of the chaff to its proper tank.

As noted previously, it is necessary to determine the crop condition and the up hill or down hill movement of the combine and then to initiate action to operate the conventional adjustment for the sieve opening and speed control for the fan. For this purpose, a shaft 34 is rotatably journaled between two walls 36 and 38 of the combine. Collars 40 are secured to the shaft 34 for properly positioning the shaft with respect to the walls 36 and 38 and for facilitating the rotation of the shaft 34. The shaft 34 is disposed transverse of the path of air moved by the fan blades 28. Secured to the shaft 34 and extending radially therefrom is a blade 42 which is substantially rectangular in outline. The blade 42 may be secured to the shaft 34 as by welding the extension 44 at 46. Noting FIGURE 1, it will be appreciated that the blade 42 constitutes an air vane which is disposed in the path of the air moved by the fan 28 the air that has been moved through the sieves causing said blade and shaft to move. However, it will further be noted that the sieves 22 are interposed between the fan spout 32 and the blade 42 so that all of the air moving from the fan 28 to the blade 42 passes through the sieves 22. The blade 42 is somewhat weighted serving as a plumb to normally position the shaft 34.

A switch actuator 50 is secured to the shaft 34 and extends radially on either side of the shaft 34. The shaft actuator 50 is disposed outside of the wall 36. The rotatable position of the shaft 34 is biased by use of a light spring 52 and a heavy spring 54 which are respectively secured between a fastener 56 on wall 36 and a fastener 58 on wall 36. A first microswitch 60 is secured to the wall 36 immediately above the switch actuator 50 while a second microswitch 62 is secured to the wall 36 immediately therebelow. It will be appreciated that when the switch actuator 50 and shaft 34 move counterclockwise from the position in FIGURE 2 with respect to the swtiches 60 and 62 to the position shown in FIGURE 3, the switch actuator 50 will engage the switch 60 to actuate it. On the other hand, when the shaft 34 moves clockwise with respect to the switches 60 and 62, the switch 62 will be engaged and actuated. The switches 60 and 62 are connected through conductors 66 particularly shown in FIGURE 5 to a speed control fan motor 26 and a relay 70 which may be electrically or mechanically operatively linked to the sieve opening adjustment means. A battery 72 grounded at terminal 74 may be provided with a toggle switch 76 being connected thereto. When the toggle switch 76 is closed, the battery may then be connected to the speed control fan motor 26 and solenoid 70 through either switch 60 or 62 dependent upon which is closed.

Referring now to FIGURE 2, the position of the shaft and switch actuator carried thereby is shown in the normal position with an average condition of the crop and with the combine riding on level ground. When the machine moves down hill, the situation depicted in FIGURE 3, the switch actuator 50 closes the switch 60 operating to increase the speed of the fan 28 and close the sieve openings, thereby saving the grain which would ordinarily be lost under such conditions. These conditions have been pointed out before and are characterized by the fact that the material has to move up hill, and therefore it is slowed down resulting in a pile up on the sieve. The additional air movement and reduced sieve opening prevents the pile up and prevents the grain from riding over the rear in the heavy chaff. In FIGURE 4, the situation is depicted when the combine is moving up hill and the switch actuator 50 then moves into engagement with the switch 62 which acts to decrease the air volume by slowing the fan speed and opening the sieves. This up hill condition is characterized by the material moving too easily over the rear of the sieves, requiring a smaller quantity of air to make it more difficult for the material to move. It is to be noted that when the openings between the sieves are reduced, they act as restrictors for causing the velocity of the air to increase.

As shown in FIGURE 2, the control vane 42 and actuator 50 are in a normal or neutral position with respect to the switches 60 and 62. This normal position is maintained when the combine is operating normally on level ground. There is a normal wind force striking the vane 42 tending to rotate it in a clockwise direction. However, this force is counterbalanced by the heavy spring 54. If the machine is operating on level ground and if for some reason such as unusual crop conditions, or malfunction of the straw walkers 18 or other operating components of the machine, the amount of grain straw passing over the sieves 22 should increase beyond a normal predetermined amount, then of course this straw would decrease the velocity of air striking the blade 42. Under such conditions, the heavy spring 54 would then rotate the actuator 50 counterclockwise so as to actuate the switch 60 for increasing the fan's speed and closing the sieve openings. On the other hand, if due to various reasons such as unusual crop conditions, malfunctioning of the grain or straw feed mechanism, the amount of straw passing across the sieves 22 should decrease below the normal amount, then it is apparent that the straw would provide less resistance to the air striking vane 42 whereupon the velocity of air striking this vane would increase so as to overcome the spring 54 and rotate actuator 50 in a clockwise direction for closing switch 62 for slowing the fan speed and opening the sieve members further apart.

FIGURE 3 illustrates the position of the control mechanism when the combine is moving downhill. When the combine is moving downhill, the grain and straw must move uphill in a rearward direction over the sieves 22. This obviously causes the straw and grain to pile up or become more compact thereby decreasing the velocity of the air passing therethrough and striking vane 42. This creates an unbalanced condition whereupon the heavy spring 54 and the weight of vane 42 rotate actuator 50 in a counterclockwise direction so as to close switch 60 for increasing the speed of the fan and moving the sieve members closer together.

When the combine moves uphill as illustrated in FIGURE 4, the straw and grain move at a faster rate rearwardly over the sieves 22 thereby becoming less dense and permitting the air from fan 24 to flow therethrough at a faster rate. As this increased velocity of air strikes the vane 42, the vane is rotated in a clockwise direction against the bias of spring 54 so as to urge the actuator 50 into contact with switch 62 for closing the switch causing the fan speed to slow down and the sieve members to be further opened. The pendulum or weight effect of the vane 42 may assist in overcoming spring 54.

While the weight or pendulum effect of the vane 42 does assist slightly in the operation of the vane thereby permitting it to be made slightly smaller, the control mechanism is controlled primarily by the wind velocity striking the vane which in turn is determined by the quantity and condition of the straw and grain on the sieves. In fact, the vane 42 could be gravitationally balanced and still operate substantially as disclosed above.

The sieves 22 are of conventional construction and may take the form illustrated in U.S. Patent No. 2,554,416. This patent illustrates the plurality of sieve members 44 extending horizontally across a rectangular frame as illustrated in FIGURE 1 of my drawings. These sieve members are all simultaneously operated by reciprocation of an end operating bar 37. To connect my operating device in FIGURE 5 to the sieve structure shown in the above mentioned patent it would only be necessary to provide a reciprocating type solenoid energized by the relay 70 and connected to the operator 37 in this patent.

The spring 52 is employed as a damper or surge control. It is also to be appreciated that the toggle switch 76 may be connected in conjunction with the starting lever of the machine for apparent reasons.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination, combine adjustable sieves for grain crops and a fan for moving air and material through said sieves, a fan speed and sieve opening control unit comprising a rotatably journaled shaft, a radially extending blade operatively connected to said shaft in the path of air that has been moved through the sieves by said fan and adapted to rotate said shaft, the air that has been moved through the sieves causing said blade and shaft to move, and control means responsive to the movement of said shaft connected to the sieves and fan thereby regulating the sieve openings and controlling the fan speed.

2. In a combine having a sieve and a power operated fan to blow air through the sieve, the improvement comprising control means for controlling the speed of the fan, a blade operated by wind from the fan, support means for movably supporting the blade on the opposite side of said sieve as the fan, said blade and support means being operatively connected to said control means whereby changes in velocity of the air blown through the sieve against the blade by the fan due to varying conditions and densities of crops on the sieve will cause said blade to move and operate said control means, the operation of said control means changing the speed of the fan.

3. The combination of claim 2 wherein said control means includes an arm radially fixed to said shaft and switches mounted adjacent said arm and engageable thereby.

4. The combination of claim 3 including spring means normally biasing said arm out of engagement with said switches.

5. The combination of claim 2 wherein said sieve is adjustable, said control means adapted to be operatively connected to said adjustable sieves for regulating the opening thereof.

6. The combination of claim 5 wherein said control means includes an arm radially fixed to said shaft and switches mounted adjacent said arm and engageable thereby.

7. The combination of claim 6 including spring means normally biasing said arm out of engagement with said switches.

8. The combination of claim 1 wherein said control means includes an arm radially fixed to said shaft and switches mounted adjacent said arm and engageable thereby.

9. The combination of claim 8 including spring means normally biasing said arm out of engagement with said switches.

10. The combination of claim 9 wherein said spring means comprises two springs connected to opposite sides of said arm, one of said springs being stronger than the other.

11. The combination of claim 1 wherein said blade is weighted and extends downwardly from said shaft so to function as a pendulum responsive to uphill and downhill movement of the combine.

References Cited in the file of this patent
UNITED STATES PATENTS

| | | |
|---|---|---|
| 2,554,416 | Morrissey | May 22, 1951 |
| 2,611,487 | Stevenson | Sept. 23, 1952 |
| 2,718,967 | Potter | Sept. 27, 1955 |
| 2,810,512 | Lippisch | Oct. 22, 1957 |
| 2,816,731 | Dantowitz | Dec. 17, 1957 |